United States Patent [19]
Rooney

[11] Patent Number: 4,554,055
[45] Date of Patent: Nov. 19, 1985

[54] SOLVENT RECOVERY

[75] Inventor: Patrick Rooney, Bartlesville, Okla.

[73] Assignee: Phillips Petroleum Company, Bartlesville, Okla.

[21] Appl. No.: 472,819

[22] Filed: Mar. 7, 1983

[51] Int. Cl.$^4$ .......................... B01D 3/10; B01D 3/12; C10G 21/28

[52] U.S. Cl. .......................................... 203/89; 203/91; 202/185 R; 202/205; 202/236; 159/49; 159/6.1; 159/DIG. 40; 208/45; 208/321

[58] Field of Search ........................ 203/89, 14, 91, 39; 159/6.2, 6.1, 13 R, 49, DIG. 40; 202/236, 185 A, 175; 208/41, 45, 44, 321

[56] References Cited

U.S. PATENT DOCUMENTS

| 3,130,108 | 4/1964 | Eckstrom | 159/6.2 |
| 3,278,415 | 10/1966 | Doberenz et al. | 208/45 |
| 3,357,479 | 12/1967 | Baird et al. | 202/236 |
| 3,678,983 | 7/1972 | Widmer et al. | 159/6.2 |
| 4,273,644 | 6/1981 | Harris et al. | 208/45 |
| 4,301,298 | 11/1981 | Horlenko et al. | 203/91 |

OTHER PUBLICATIONS

Luwa Bulletin, EV-24, pp. 8 & 9, Luwa Corp., Charlotte, N.C.
Emmerling, Apr. 1975, Chemical Processing.
Hukill, Jr. et al., Jan. 1971, Chemical Processing.
Booth, III et al., Jan. 1983, Chemical Processing, pp. 34-35.
Nash Vacuum Pumps and Compressors, Bulletin No. 417-A, 1966, pp. 1-12, esp. p. 5.
J. H. Perry, Chemical Engineer's Handbook, pp. 6-24, 1963, McGraw-Hill, N.Y.

Primary Examiner—S. Leon Bashore
Assistant Examiner—Virginia Manoharan
Attorney, Agent, or Firm—French and Doescher

[57] ABSTRACT

Method and apparatus for recovering a solvent from a mixture containing the solvent is disclosed. In certain aspects, a portion of the recovered liquid is recycled and used in the evaporative process, such as for the seal liquid in a liquid ring vacuum pump. In another aspect, the initial separation is achieved in a thin film evaporator operating under partial vacuum from the liquid ring vacuum pump.

14 Claims, 4 Drawing Figures

4,554,055

SOLVENT RECOVERY

This invention relates to solvent recovery. In another aspect, this invention relates to an apparatus for recovering solvent.

A great many chemical processes can be conducted in the presence of a solvent. Frequently however, such processes are economically unattractive unless provision is made for solvent recovery.

Typically, the solvents used in these chemical processes are recovered by evaporative processes. Sometimes the evaporative process is not as efficient as desired because separation of the solvent from the desired component will not satisfactorily proceed under allowable temperature constraints. Such can be the case where the solvent has complexed with the desired product. It can also be the case where the solvent becomes dissolved in an extremely viscous or solid product. The present invention is especially applicable to removing solvent from very viscous or solid product.

OBJECTS OF THE INVENTION

It is an object of this invention to provide a process for recovering a solvent from a highly viscous or solid material.

It is a further object of this invention to provide an apparatus for recovering a solvent from a highly viscous or solid material.

STATEMENT OF THE INVENTION

According to one aspect of the present invention, there is provided a process comprising separating a mixture comprising water, a heavy organic component and a solvent for the heavy organic component into a gas phase containing predominantly the solvent for the heavy organic component and water and a liquid phase containing predominantly the heavy organic component by an evaporative process. A major portion of the thus separated gas phase is compressed to a liquid for recovery with a cool liquid recycle stream provided as set forth below. The liquefied portion of the gas phase is combined with the liquid medium with which it is compressed. From these combined liquids there is provided first liquid phase and a second liquid phase. From one of these phases there is provided the recycle stream for compressing the gas phase to liquid. By this method, the desired materials can be recovered with minimal disposal problems.

In another aspect of the present invention, there is provided an apparatus which comprises an evaporator vessel and a vacuum pump, the vacuum pump having at least one inlet and an outlet. A first means for forming a flow path connects the evaporator to an inlet of vacuum pump. The apparatus further comprises a settler vessel, a second means for forming a flow path extending between the outlet of the vacuum pump and the settler vessel, and a third means for forming a flow path extending between the settler vessel and one of the at least one inlets to the vacuum pump. This apparatus is especially well suited to provide the advantages of the process previously described.

BRIEF DESCRIPTIONS OF THE DRAWINGS

FIG. 1 schematically illustrates certain features of the present invention.

FIG. 2 schematically illustrates an apparatus suitably employed in carrying out part of the process shown in FIG. 1.

FIG. 3 illustrates a cross-sectional view of the apparatus shown in FIG. 2 taken along the indicated lines.

FIG. 4 schematically illustrates a cross-sectional view of an apparatus suitably employed to carry out a part of the process shown in FIG. 1.

DETAILED DESCRIPTION OF THE INVENTION

Figure 1:
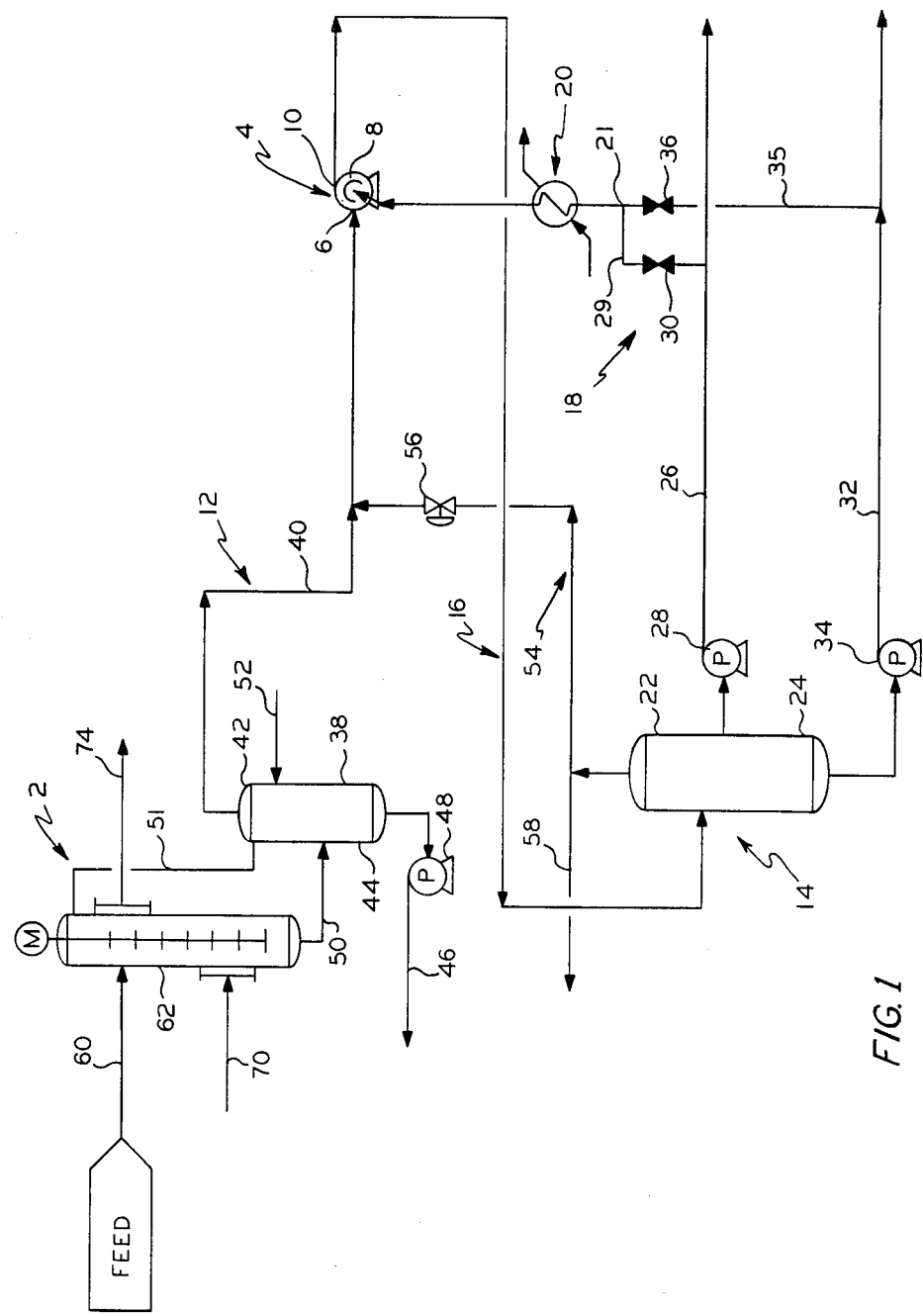

According to certain aspects of the present invention, an apparatus comprises an evaporator vessel 2 and a vacuum pump 4 having a first inlet 6 and at least one outlet 10. The illustrated pump 4 also is provided with a second inlet 8. The evaporator vessel 2 and the vacuum pump 4 are connected by a first means 12 for forming a flow path extending between the inlet 6 of the vacuum pump and the evaporator vessel 2. The apparatus further comprises a settler vessel 14 and a second means 16 for forming a flow path extending between the outlet 10 of the vacuum pump 4 and the settler vessel 14. The apparatus is still further characterized by a third means 18 for forming a flow path which extends between the settler vessel 14 and the inlet 8 of the vacuum pump 4.

Since the vacuum pump 4 will provide better results when the sealing fluid with which it is provided via means 18 is cooled, the third means 18 for forming a flow path further comprises a means 20 for cooling the contents of the third means 18. Generally, the means 20 comprises a cooler to provide indirect heat exchange for the contents of the means 18 with a cooling fluid such as chilled water or refrigerant for example.

In one embodiment of the present invention, the third means 18 connects an upper portion 22 of the first settler vessel 14 with the inlet 8 to the vacuum pump 4. When the first settler vessel 14 contains an upper liquid phase and a lower liquid phase, the upper portion of the first settler 14 is that portion which contains the upper liquid phase. In another aspect of the present invention, which preferably can be practiced as an alternative to the embodiment where the third means 18 connects the upper portion 22 of the settler to the inlet 8 of the vacum pump 4, the third means 18 is employed to connect a lower portion 24 of the first settler 14 with the inlet 8 of the vacuum pump 4. Where the first settler vessel 14 features phase separation of an upper liquid phase and a lower liquid phase, the lower portion 24 of the first settler vessel 14 is that portion of the first settler vessel 14 which contains the lower liquid phase.

No matter whether the third means is connected to the upper portion 22 or the lower portion 24 of the settler vessel, it is preferable to pass the contents of the third means through the cooler 20. To show these options, the third means 18 which connects to the portion 22 of the settler comprises a line 26 which contains a pump 28 so as to withdraw fluid from the upper liquid phase in the first settler vessel 14. A line 29 containing a valve 30 connects the line 26 to the cooler 20. By manipulating the valve 30, the liquid flow from the upper portion 22 of the first settler vessel 14 and through the means 18 to the inlet 8 of the vacuum pump 4 can be regulated as desired.

For withdrawing liquid from the lower portion 24 of the settler vessel 14 a line 32 containing a pump 34 is connected to the lower portion 24 of the vessel. A line 35 containing a valve 36 connects the line 30 to the inlet 21 of the cooler 20. By manipulating the valve 36, the flow of liquid from the lower portion 24 of the settler vessel 14 to the inlet 8 of the vacuum pump 4 can be controlled as desired.

Usually, when the apparatus contains one of line 26 and valve 30 or line 35 and valve 36, the other can be considered optional. The heat duty of the cooler 20 of course will depend on whether the means 18 is connected to the upper portion 22 or the lower portion 24 of the first settler vessel 14.

Generally, the line 32 will contain excess water and will be routed offsite for a proper and safe disposal. Usually the line 26 will contain excess solvent and can be routed to storage.

In one embodiment of the present invention, the first means 12 for forming a flow path extending between the evaporator vessel 2 and the inlet 6 to the vacuum pump 4 comprises a second vessel 38 suitable for separating the contents of the first means 12 into a gas phase and a liquid phase and a conduit or line 40 connecting the upper portion 42 of the vessel 38 with the inlet 6 of the vacuum pump 4. Where the vessel 38 is used to separate the contents of the conduit means 12 into a gas phase and a liquid phase the upper portion 42 of the vessel 38 will be that portion of the vessel which contains a gas phase. Generally, a liquid phase will exist in a lower portion 44 of the vessel 38. In accordance with one embodiment of the invention, the liquid phase in the lower portion 44 of the vessel 38 is the desired product. It can be withdrawn as desired by line 46 containing pump 48 associated therewith, the line 46 being connected to the lower portion 44 of the vessel 38. A line 50 establishes a flow path from between the evaporator vessel 2 and the separator vessel 38 for the introduction of material from the evaporator vessel and to the separator vessel. The vessel 38 is further provided with a desirable, but not essential inlet 52 emptying into the upper portion 42 for the introduction of a gas. The purpose of the gas is to assure that vacuum pump 4 is never completely liquid full. Damage to the rotor or vibration of the rotor may occur if the vacuum pump goes to a liquid full condition.

In a still further aspect of the invention, the apparatus comprises a fourth means 54 for forming a flow path which extends between the upper portion 22 of the first settler vessel 14 and empties into the conduit 40 which connects the upper portion of the second vessel 38 with the inlet 6 of the vacuum pump 4. A valve 56 is positioned in the conduit 54 for regulating the flow of this gaseous recycle stream. The line 54 is preferably also connected to a line 58 for control purposes and to prevent a liquid full condition on vacuum pump 4. The line 58 preferably connects the first settler vessel 14 with a furnace or the like for the incineration of volatiles from the upper portion 22 of the vessel 14.

Figure 2:
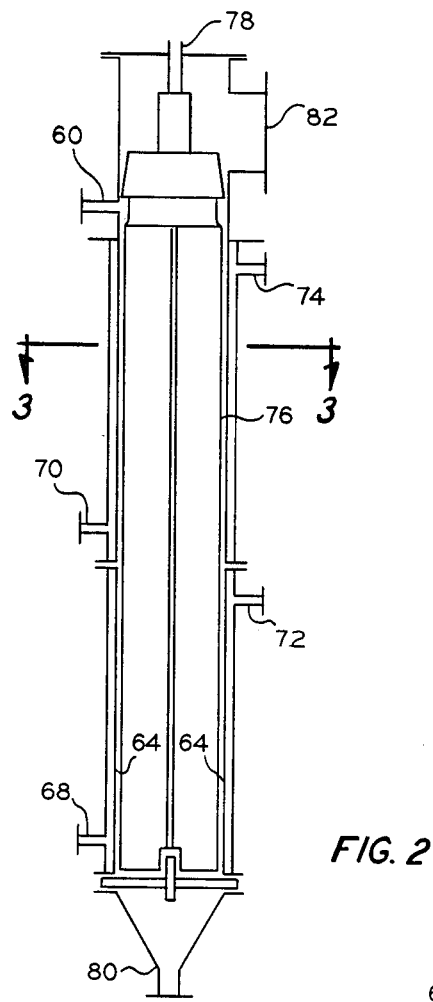
Figure 3:
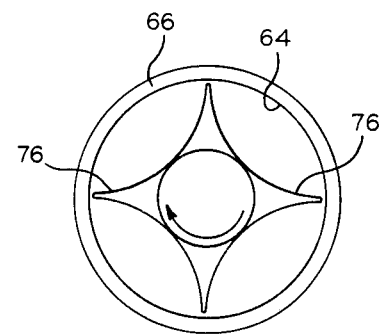

With reference now to FIGS. 2 and 3, an evaporator vessel which provides good results is a so-called wiped film evaporator 62. The evaporator 62 is generally characterized by generally cylindrical interior surface 64. The interior surface 64 is usually surrounded by a jacket 66, generally an annular jacket to provide for the flow of heating medium. In the embodiment of the invention illustrated in FIG. 2, the heating medium, usually steam, is introduced into the jacket 66 through inlets 68 and 70 and exhausted through outlets 72 and 74. Since the jacket 66 is divided into two portions, the heating medium such as steam introduced via 68 and 70 can be of different temperatures and flow rates. At least one rotor blade 76 is positioned in the evaporator 62 to revolve about a longitudinal axis of the device 62 on shaft 78. An evaporator having 4 rotor blades can be used with good results. Feed material introduced into the upper portion of the apparatus via inlet 60 is distributed on the generally cylindrical interior surface 64 of the evaporator 62 and flows downwardly by gravity to outlet 80, all the while being subjected to indirect heat exchange by the heating medium introduced in inlets 68 and 70 and being distributed and redistributed by the rotor blades 76. As this occurs, vapors liberated from the feed material can be withdrawn from the evaporator 62 via outlet 82 at the upper end. The outlet 82 connects to the line 51 leading to the separator vessel 38. The outlet 80 connects to the line 50 leading to the separator vessel 38. Where line 50 is large enough, the line 51 can be considered optional.

Figure 4:
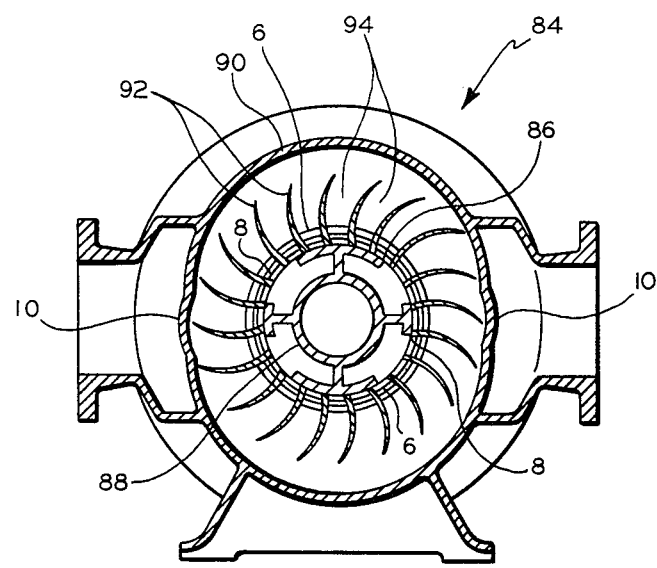

With reference now to FIG. 4, the preferred vacuum pump of the present invention is the so-called liquid ring vacuum pump. In the 2-cycle pump shown in FIG. 4, there are two suction and compression cycles per rotation of the central rotor. This vacuum pump 84 is characterized by a rotor 86 comprising a shaft 88 positioned in a housing 90. The shaft 88 has a plurality of vanes 92 mounted to it. The vanes 92 extend longitudinally along the shaft 88 and radially from the shaft 88 defining cavities 94 of sequentially such as sinusoidally varying volume between the vanes 92 and the wall of the housing 90. The cavities of sequentially varying volume are determined by a sequentially varying distance between the shaft 88 and the housing wall 90 as measured between the vanes 92. The distance between the rotor and the housing can be varied by symmetrically positioning the rotor in a housing having a generally elliptical cross section, although in some devices utilizing a single suction/compression stroke per revolution of the rotor the same principle can be applied by mounting the shaft asymmetrically in a generally cylindrical housing. In the illustrated device, sealing liquid is introduced via inlets 8 near the shaft axis through the end walls of the housing. As the shaft 88 is rapidly rotated in a clockwise direction, the liquid is slung centrifugally outward to follow the contours of the housing 92. Sufficient liquid is introduced so that the surface of the liquid remains positioned between the vanes. As the liquid flows radially outward from between the vanes to follow the housing there is created a partial vacuum and at that point the expanding cavities sweep past inlet ports 6 on the suction stroke. As the shaft 88 continues to rotate, the vanes move toward the exit port 10 and the liquid surface flows radially inward, condensing at least a portion of the vapors introduced into the device through the inlet port 6. The combined liquids are exhausted from the apparatus through the ports 10. The device is thus characterized in that the surface of the working liquid moves radially in and out between the vanes in a piston-like manner as the shaft 88 is rapidly rotated. The apparatus thus described can be used to carry out a process characterized as follows.

An evaporative process, such as is carried out in evaporator 2, is used to separate a mixture introduced via 60 comprising water, a heavy organic component, and a solvent for the heavy organic component into a gas phase which contains predominantly the solvent for the heavy organic component and water and a liquid phase containing predominantly the heavy organic component. Generally, the heavy organic component will be solid or plastic at room temperature and will pass through a highly viscous stage during the solvent recovery process. The process can be used with good results to recover solvent from a heavy asphaltic material such as a sulfonated asphalt. The solvent recovered from this type of material can be most any solvent but since hydrocarbons are relatively inexpensive they are the solvent of choice. Suitably, a light hydrocarbon is employed in the mixture introduced into the evaporator via the line 60 such as a light hydrocarbon comprising a hydrocarbon containing from about 4 to about 8 carbon atoms. In the embodiment of the invention the solvent comprises hexane and the heavy organic component comprises a sulfonated asphalt particulate. Thus the mixture introduced into the evaporator via the line 60 is in the form of a slurry, with solvent to be recovered being mostly free but also some hexane being in the particulate material.

The gas phase resulting from the separation of the mixture 60 is compressed with liquid medium in the pump 4 using a cool liquid recycle stream preferably which has passed through the cooler 20. In the pump 4 the liquefied portion of the gas phase is combined with the liquid medium which has entered the pump via inlet 8. The combined liquid portions are then passed from the pump 4 via the conduit means 16. Generally, two liquid phases will be carried by the line 16 and introduced into the first settler vessel 14 so that from the combined liquids carried by the conduit 16 there is separated a first liquid phase and a second liquid phase. For convenience, the first liquid phase will be defined as the liquid phase in the upper portion 22 of the first settler vessel 14 and the second liquid phase will be defined as the liquid phase in the lower portion 24 of the first settler vessel 14. A portion of one of these phases is withdrawn from the first settler vessel 14 as a recycle stream and introduced into the pump 4 from line 26 or 32.

Where the first liquid phase is light hydrocarbon and the second liquid phase is water, which is the preferred embodiment of the invention, either is suitably employed as the recycle stream introduced into pump inlet 8. Where water is used, chilled water can be used as the refrigerant in cooler 20 because of the relatively low vapor pressure of water. Where the recycle stream is drawn from the first liquid phase from the upper portion 22 of the settler 14, other types of refrigerants may be necessary.

Generally, some noncondensed gases will be introduced into the first settler 14 from the line 16. These gases are preferably withdrawn from the upper portion 22 of the first settler 14 via the line 54. A portion of the gas stream carried by line 54 can be combined if desired with a portion of the gas stream carried by the line 40. In this manner, gas flow to the vacuum pump 4 is ensured so that untimely apparatus failure is rendered unlikely. Some vapor is needed at all times. Also line 54 is used for start-up of the hexane recovery system.

The invention is illustrated by the following example.

EXAMPLE

The following calculated example is used to illustrate the recovery of n-hexane from an aqueous Soltex ® hydrocarbon slurry.

Soltex ® is a drilling mud additive made by Phillips Petroleum Company for stabilizing shale sections in oil formations and for inhibiting solids dispersion within the drilling fluid slurry. Soltex ® is mainly sodium asphalt sulfonate with minor amounts of asphalt phenolates, inorganic salts, and oxidized asphalt. By stabilization we mean that when shale fractures, the edges are more positively charged electrically than the faces, thus micro-fractures in shales represent small lines of positive charge. These are bound together by the electronegative Soltex ® particle in solution, thus inhibiting disintegration of the shale. By inhibiting the dispersion of drilled solids an explanation is necessary. Drilled solids or mud-making solids are a form of hydratable shale or gumbo. At times, these soft shales make it possible to control mud properties. Sometimes they stick together, forming large mud balls in the annulus. Soltex ® minimizes the reduction of the shale particle from the original cutting size. Its electrostatic attraction also minimizes both dispersion and aggregations. The composition and manufacture of ingredients of Soltex ® are described in U.S. Pat. Nos. 3,028,333; 3,264,214; and 3,485,745.

To further illustrate the recovery of hexane from aqueous Soltex ® slurry, calculated mass flows are given in Table I.

Soltex ® slurry containing n-hexane solvent is fed to a wiped film evaporator via conduit 60. Said evaporator uses about 100 square feet of evaporator surface and requires about 40 horsepower for the rotating internal wiper blades. Overhead vapor and bottom liquid slurry from said evaporator is fed to a separator vessel 38, the bottoms liquid slurry of which is pumped via conduit 46 to drum dryers (not shown). The separator has the approximate diameter of 38 inches and is about 6 ft in height. A gas purge fed to separator 38 is shown as conduit 52 of Table I.

The overhead stream from the separator is fed to vacuum pump suction via conduit 40 and contains primarily hexane vapor with a minor amount of water vapor.

A liquid ring rotary vacuum pump compresses hexane and water vapor and discharges as pump discharge 10 to a decanter or phase first settler 14. The rotary "liquid piston" vacuum pump is driven by a 20 horsepower motor to compress and condense hexane with recycled water, resulting in the flow of pump discharge 10. A bleed stream of fuel gas and hexane vapor 58 is sent to a boiler (not shown) for fuel. The decanter is a vessel about 6 feet in diameter and 12 feet in height.

The bottoms from said decanter, a major portion of which is water, are pumped via conduit 32 and are recycled to the vacuum pump via conduit 35 as given in Table I. Liquid hexane is withdrawn from the upper phase of decanter 24 to be pumped via conduit 26 to a recovery system (not shown).

TABLE I

| Lbs/Stream/Hour | 60 | 46 | 52 | 10 | 58 |
|---|---|---|---|---|---|
| Asphalt | | | | | |
| Hexane | 2,987.2 | 31.4 | | 2,967.0 | 78.1 |
| Fuel Gas | | | 80.0 | 82.2 | 79.8 |
| Water | 2,525.0 | 1,743.0 | | 80,809.0 | 2.7 |
| Soltex ® | 2,409.1 | 2,409.1 | | | |

TABLE I-continued

| | | | | | |
|---|---|---|---|---|---|
| Totals (Lb/Hr) | 7,948.3 | 4,183.5 | 80.0 | 83,858.2 | 160.6 |
| Totals (lb/batch) | 12,717.3 | 6,693.6 | 128.0 | 134,173.1 | 257.0 |
| Transfer Rate (Lb/Hr) | 7,948.3 | 4,183.5 | 80.0 | 83,858.2 | 160.6 |
| Transfer Rate (gpm) | 15.75 | 6.92 | — | 170.7 | — |
| Temperature (°F.) | 115. | 175. | 100. | 80. | 80. |
| Pressure (PSIA) | 15.2 | 14.7 | 14.1 | 20. | 20. |
| Specific Gravity | 1.01 | 1.21 | — | 0.983 | — |
| Density (Lb/ft$^3$) | 62.8 | 75.3 | 0.0376 | 61.4 | 0.0919 |
| Specific Heat (BTU/lb °F.) | 0.75 | 0.86 | 0.555 | 0.98 | 0.468 |
| Viscosity (cP) | 4–10 | 10–20 | 0.0112 | 0.73 | 0.0086 |
| Vapor Pressure (mm Hg) | 250 | 400. | — | — | 1,034. |
| Avg. Mol. Wt. (Lb/Lb Mol) | — | — | 16.04 | 20.43 | 26.6 |

| Lbs/Stream/Hour | 40 | 32 | 26 | 35 |
|---|---|---|---|---|
| Asphalt | | | | |
| Hexane | 2,955.8 | 11.3 | 2,877.6 | 11.2 |
| Fuel Gas | 80.0 | 2.3 | 0.1 | 2.2 |
| Water | 809.0 | 80,805.3 | 1.0 | 80,000.0 |
| Soltex ® | | | | |
| Totals (Lb/Hr) | 3,844.8 | 80,819.9 | 2,878.7 | 80,013.2 |
| Totals (lb/batch) | 6,151.7 | 129,310.2 | 4,605.9 | 128,021.1 |
| Transfer Rate (Lb/Hr) | 3,844.8 | 80,819.9 | 2,878.7 | 80,013.2 |
| Transfer Rate (gpm) | | 161.7 | 8.66 | 160.1 |
| Temperature (°F.) | 175. | 80. | 80. | 60.0 |
| Pressure (PSIA) | 14.1 | 40.0 | 15. | 20.0 |
| Specific Gravity | — | 1.0 | 0.665 | 1.0 |
| Density (Lb/ft$^3$) | 0.0938 | 62.4 | 41.8 | 62.4 |
| Specific Heat (BTU/lb °F.) | 0.403 | 1.0 | 0.58 | 1.0 |
| Viscosity (cP) | 0.0085 | 0.75 | 0.3 | 0.75 |
| Vapor Pressure (mm Hg) | 729. | 25.8 | 155. | 25.8 |
| Avg. Mol. Wt. (Lb/Lb Mol) | 45.7 | 18.02 | 86.0 | 18.02 |

That which is claimed is:

1. A process comprising:
    separating a mixture comprising water, a heavy organic component and a solvent for the heavy organic component into a gas phase containing predominantly the solvent for the heavy organic component and water and a liquid phase containing predominantly the heavy organic component by an evaporative process;
    compressing the gas phase with liquid medium formed from a cool liquid recycle stream as below defined to liquefy a major portion of said gas phase;
    combining the liquefied portion of the gas phase with the liquid medium;
    phase separating from the combined liquids a first liquid phase and a second liquid phase; and
    withdrawing a portion of one of the first liquid phase and the second liquid phase as the recycle stream.

2. A process as in claim 1 wherein the evaporative process comprises
    forming a film of the mixture comprising water, the heavy organic component, and the solvent for the heavy organic component;
    heating the film;
    subjecting the film to a partial vacuum, said partial vacuum and heating being conducted so as to vaporize a major portion of the solvent from the heavy organic component and a minor portion of the water from the mixture; and
    wherein said process further comprises the step of cooling the recycle stream prior to compressing the gas phase.

3. A process as in claim 2 wherein solvent for the heavy organic component comprises a light hydrocarbon, the first liquid phase comprises predominantly the light hydrocarbon, and the second liquid phase comprises predominantly water.

4. A process as in claim 3 wherein the recycle stream is withdrawn from the first liquid phase.

5. A process as in claim 3 wherein the recycle stream is withdrawn from the second liquid phase.

6. A process as in claim 3 wherein the light hydrocarbon comprises a $C_4$–$C_8$ hydrocarbon.

7. A process as in claim 6 wherein the light hydrocarbon comprises hexane and the heavy organic component comprises a sulfonated asphalt particulate.

8. A process as in claim 1 further comprising separating a gas stream from the combined liquids.

9. A process as in claim 8 further comprising combining a portion of the gas stream with the gas phase from the mixture.

10. Apparatus comprising:
    (a) an evaporator vessel;
    (b) a vacuum pump having a first inlet, a second inlet, and an outlet;
    (c) a first means for forming a flow path extending between the first inlet of the vacuum pump and the evaporator vessel;
    (d) a first settler vessel;
    (e) a second means for forming a flow path extending between the outlet of the vacuum pump and the first settler vessel; and
    (f) a third means for forming a flow path extending between an upper portion of the first settler vessel and the second inlet of the vacuum pump; and
    (g) a means for cooling the contents of the third means.

11. Apparatus as in claim 10 wherein the first means further comprises a second vessel suitable for separating the contents of the first means into a gas phase and a liquid phase and a conduit connecting an upper portion of the said second vessel with the first inlet of the vacuum pump.

12. Apparatus comprising
    (a) an evaporator vessel;
    (b) a vacuum pump having a first inlet, a second inlet, and an outlet;

(c) a first means for forming a flow path extending between the first inlet of the vacuum pump and the evaporator vessel;
(d) a first settler vessel;
a second means for forming flow path extending between the outlet of the vacuum pump and the said first settler vessel;
(f) a third means for forming a flow path extending between a lower portion of the first settler vessel and the second inlet of the vacuum pump;
(g) a means for cooling the contents of the third means; and
(h) a fourth means for forming a flow path extending between an upper portion of the first settler vessel and the first means for forming a flow path.

13. An apparatus as in claim 10 wherein the evaporator vessel is characterized by a cylindrical interior surface surrounded by a jacket for flow of heating medium and at least one rotor blade positioned to revolve around a longitudinal axis of the evaporator vessel and distribute material on the cylindrical interior surface of the vessel.

14. An apparatus as in claim 10 wherein the vacuum pump is characterized by a rotor comprising a shaft positioned in a housing, said shaft having a plurality of vanes mounted thereon, said vanes extending longitudinally along the shaft and radially from the shaft with cavities of sequentially varying volume being defined between the vanes and the housing due to a sequentially varying distance between the shaft and the housing as measured between the vanes so that the surface of a working liquid will move radially in and out between the vanes in a piston-like manner as the shaft is rapidly rotated.

* * * * *